June 30, 1959     J. R. COLEY ET AL     2,892,770
PLATINUM CATALYST REGENERATION AND REJUVENATION SYSTEM
Filed March 15, 1954
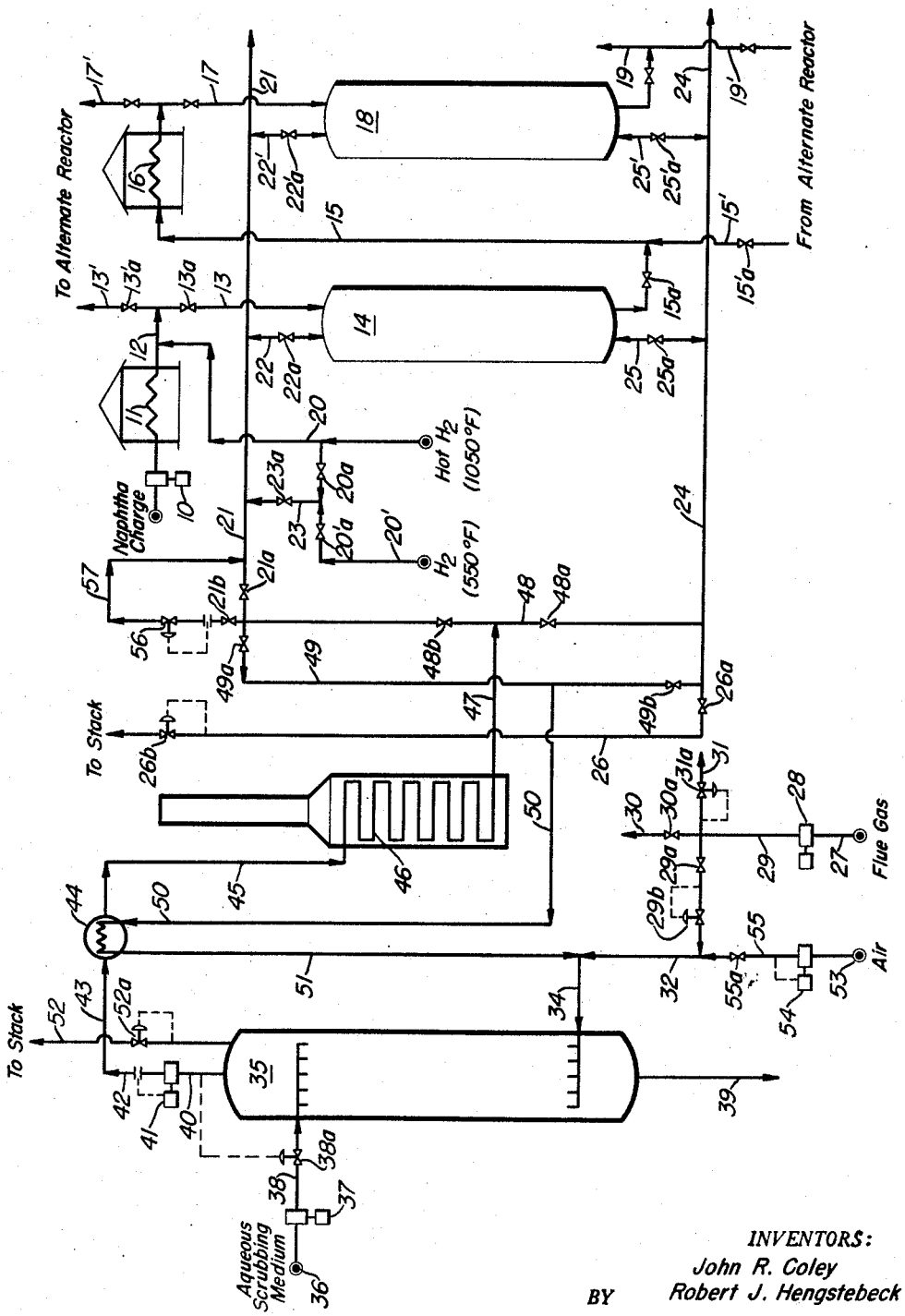
INVENTORS:
John R. Coley
Robert J. Hengstebeck
BY
Donald E. Payne
ATTORNEY United States Patent Office 2,892,770
Patented June 30, 1959

2,892,770

PLATINUM CATALYST REGENERATION AND REJUVENATION SYSTEM

John R. Coley, Gary, and Robert J. Hengstebeck, Valparaiso, Ind., assignors to Standard Oil Company, Chicago, Ill., a corporation of Indiana Application March 15, 1954, Serial No. 416,072

15 Claims. (Cl. 208—140)

This invention relates to improvement in a platinum catalyst reactivation system, and it pertains more particularly to avoidance of catalyst deactivation caused by sulfur dioxide and water during regeneration of the catalyst.

In the ultraforming process (copending application Serial No. 347,635, filed April 9, 1953, now U.S. Patent 2,773,014) hydroforming is effected by passing a mixture of naphtha and recycle hydrogen in series through a plurality of reactors containing platinum-on-alumina catalyst under conversion conditions with intermediate reheating and provision is made for replacing any one of the reactors with an alternate or "swing" reactor so that the catalyst in any one of the reactors may be reactivated by periodic regeneration and rejuvenation. The regeneration step comprises burning hydrocarbonaceous deposits with recycled flue gas containing a controlled amount of oxygen, usually of the order of about 1 percent, so that a combustion front traverses the catalyst bed without exceeding safe temperature limits and in the rejuvenation step the regenerated catalyst is contacted with a gas containing a higher partial pressure of oxygen, preferably at about 950° F. to 1050° F., for an extended period of time after substantially all of the hydrocarbonaceous material has been removed from the catalyst. The hydrocarbonaceous material which deposits on the catalyst when naphtha is passed over the catalyst at high temperatures contains hydrogen and carbon in weight ratio of, as an average, about 1:9 and with this material is associated surfur in varying amounts depending on the sulfur content of the naphtha fed to the catalyst bed. During the regeneration of the catalyst, the hydrogen of the hydrocarbonaceous material is converted to water vapor and the sulfur is oxidized to sulfur dioxide and then to sulfur trioxide by the oxygen in the regeneration gas. It has been discovered that when regeneration gases contain even small amounts of sulfur dioxide in the presence of oxygen, for example, 0.01–0.2 percent of sulfur dioxide, the platinum catalyst converts the sulfur dioxide to sulfur trioxide which in turn converts at least a portion of the alumina support to aluminum sulfate and thus causes catalyst deactivation. Moreover, the regeneration gas becomes enriched with water vapor when the regeneration gas is recycled.

It has been discovered that the catalyst becomes deactivated in the presence of either sulfur dioxide (convertible in situ to sulfur trioxide) or water vapor in large amounts. An object of this invention is to avoid such catalyst deactivation. Another object is to provide an improved regeneration system for platinum-on-alumina catalyst which will avoid corrosion, blocking, and other operating difficulties. A further object is to provide a regeneration system which can be constructed and operated at minimum capital investment and operating costs. Still another object is to provide a regeneration system wherein the regeneration gas can be recycled and reused for the regeneration of deactivated platinum-on-alumina catalyst without deleteriously affecting the activity of the catalyst by such reuse of regeneration gas. Other objects will be apparent as the detailed description of the invention proceeds.

It has long been known that for many types of catalysts, excessive water should be avoided in regeneration gases (U.S. 2,278,509 and U.S. 2,215,304). It was not heretofore appreciated, however, that the sulfur dioxide formed by the combustion of sulfur in hydrocarbonaceous deposits, unless removed from the system, results in the production of sulfur trioxide in situ during the regeneration cycle as a result of the presence of oxygen and the platinum catalyst, and that the presence of the sulfur trioxide results in the sulfation of at least a part of the alumina of the catalyst with the result that the platinum-on-alumina catalyst becomes deactivated with respect to activity and selectivity and with respect to maintenance of activity for the conversion of low octane number petroleum naphthas to high octane number petroleum naphthas.

In accordance with our invention the regeneration gas is scrubbed with an aqueous liquid under pressure for removing substantially all of the sulfur dioxide and reducing the water content of the gas to less than 1 percent. An alkaline material which is substantially free from combined nitrogen may be dissolved in the aqueous liquid in amounts sufficient to insure removal of the sulfur dioxide. Alkali metal hydroxides or carbonates are preferred over alkaline earth oxides or hydroxides because of less tendency to precipitate insoluble carbonates from the regeneration gas. Basic nitrogen compounds are preferably avoided because certain nitrogen compounds are deleterious to catalyst activity. The amount of alkaline agent added will depend on the amount of sulfur in the hydrocarbonaceous deposits, but at most only two mols of sodium hydroxide are used per mol of sulfur in the gas stream. At the scrubbing pressure of 100 to 500 p.s.i.g. and temperature of about 100° F. water itself may be sufficient to remove substantially all of the sulfur dioxide when it is present in small amounts. When added caustic is employed, its concentration need only be of the order of .01 to 1 percent by weight.

The reactivation of the catalyst includes steps of purging, rejuvenation, and sometimes hydrogen treating in addition to the regeneration per se. Our invention is primarily in the regeneration step but it also relates to the combination of steps employed. During regeneration, the high temperature combustion gases from the catalyst bed undergoing regeneration (and externally generated flue gas if it contains an appreciable amount of sulfur dioxide) are scrubbed under pressure with an aqueous medium such as water or a dilute alkaline solution in order to cool the gas to substantially atmospheric temperature and at the same time remove substantially all of the sulfur dioxide, sulfur trioxide, and most of the water therefrom. The scrubbed flue gas is compressed for recirculation, preheated by heat exchange with gases entering the scrubbing zone, and further heated to about 700° to 800° F. in an indirect heater before being returned to the catalyst bed with added oxygen for effecting the desired regeneration. While the invention is particularly important in the regeneration portion of the cycle, it should be understood that during rejuvenation or other portions of the cycle, sulfur dioxide should be kept out of the streams introduced to the catalyst bed, particularly when free oxygen or an oxygen-affording material is present in contact with said bed at reaction conditions such that sulfur trioxide may be formed.

The invention will be more clearly understood from the description of the regeneration portion of a commercial ultraforming plant read in conjunction with the accompanying drawing which forms a part of this specification and which constitutes a schematic flow diagram of said regeneration system.

The reactor system employed for a 9,000 barrel per day ultraforming unit may be as described in U.S. 2,773,014, except that four reactors are preferably employed instead of three, in addition to the alternate or swing reactor, and downflow is preferably employed during the on-stream period. The naphtha charge is introduced by pump 10 into heater 11 and thence by transfer line 12 and line 13 to the first reactor 14 together with about 4,000 cubic feet (measured at standard conditions) per barrel of hot recycle hydrogen which is introduced into the transfer line by line 20. The charging stock may be a Mid-Continent virgin naphtha having an A.P.I. gravity of about 58.2° and boiling in the range of about 150° to 400° F., which naphtha preferably contains less than about 0.1 percent sulfur, although it usually contains at least 0.01 percent; the sulfur content is rendered less critical by this invention. This naphtha charge has an F-1 octane number of about 46 and an F-2 octane number of about 45, and its composition is roughly about 40 percent naphthenes, 8 percent aromatic hydrocarbons, and 52 percent paraffins, all by volume.

The mixture of naphtha vapors and hydrogen is introduced into the first bed of platinum-on-alumina catalyst in reactor 14 at a temperature of about 950° F. and at a transfer line pressure of about 320 p.s.i.g. Each reactor contains about 10.5 tons or 422 cubic feet of catalyst in the form of ⅛ inch diameter pellets. Such catalyst may be prepared by contacting an aqueous solution of chloroplatinic acid containing about 3.5 grams of platinum per liter with an ammonium sulfide solubilizing agent and combining the resulting true or colloidal solution with hydrous alumina prepared as taught in U.S. Reissue 22,196, the relative amounts of the two components being such as to give a final catalyst containing about 0.3 to 0.6 percent of platinum by weight on a dry basis and the resulting mixture then being dried and calcined. The alumina may contain a small amount of halogen such as fluorine or chlorine, but it should be substantially free from sodium iron, and molybdenum. Since platinum-on-alumina catalysts and their methods of preparation are known to those skilled in the art, they are not described in further detail.

The effluent stream leaves reactor 14 by line 15, is reheated to about 950° F. in reheater 16 and introduced by line 17 into second reactor 18, wherein the catalyst bed is similar to that in reactor 14. In the same manner, the effluent stream from reactor 18 passes by line 19 to a second reheater and third reactor and then through a third reheater and fourth reactor before the final effluent is separated from hydrogen and fractionated. The major part of the separated hydrogen is reheated to about 1050° F. and provides the hot hydrogen introduced through line 20. Additional amounts of the separated hydrogen may be reheated to about 550° F. and introduced in varying amounts through line 20'. An alternate or swing reactor may take the place of any of the on-stream reactors wherein catalyst requires reactivation; thus when reactor 14 is undergoing reactivation, the initial charge from transfer line 12 is directed to the alternate reactor through line 13' and the effluent from the alternate reactor is returned to reheater 16 by lines 15' and 15. Since no invention is claimed in the reactor system per se, only that portion of the system which is shown in the drawings which is required to illustrate the present invention which is directed to the reactivation of catalyst in any one of the reactors or in the alternate reactor.

Each of the reactors is connected to a reactivation system by upper manifold 21 and a line 22, 22', etc., each provided with a shutoff valve 22a, 22'a, etc. Hot hydrogen from line 20 or a mixture thereof with hydrogen from line 20' can be introduced into manifold 21 by line 23 which is provided with valve 23a. Each of the reactors is also connected to the reactivation system by lower manifold 24 and line 25, 25', etc., containing a valve 25a, 25'a, etc. Gases may be vented from a reactor to a stack by opening valve 26a in line 26, the desired back pressure in line 26 being held by pressure control valve 26b.

Flue gas from source 27 at about atmospheric pressure and 100° F. and in amounts of about 20,000 cubic feet per hour is compressed by compressor 28 to about 380 p.s.i.g. and introduced into the reactivation system through line 29 at about 300° F. A part of this flue gas is passed by line 30 in amounts controlled by valve 30a to provide inert sealing gas between valve plates separating portions of the system which are on-stream from portions undergoing regeneration. Any amounts of flue gas in excess of that required may be vented in amounts controlled by valve 31a in line 31. An aqueous scrubbing medium such as water or preferably a dilute caustic solution is introduced from source 36 by pump 37 and line 38 into the upper part of tower 35, the scrubbing liquid being withdrawn from the tower through line 39. The aqueous liquid is introduced at a rate of approximately 150 gallons per minute, the rate being controlled by valve 38a to maintain the temperature of the scrubbed gases in line 40 at about 100° F. The scrubbing of the flue gas removes most of the water vapor and substantially all of the sulfur dioxide which may be contained therein and at the same time cools the gas to the desired temperature for the suction inlet of circulator 41. This circulator operates at a rate to discharge cooled flue gas at a predetermined flow rate through line 42 to line 43, heat exchanger 44, and line 45 to indirect heater 46. Heater 46 may be operated to raise the temperature of the gas either to 700° F. (for regeneration) or to 1050° F. (for rejuvenation). The hot gas may then be conducted by line 47 and line 48 to lower manifold 24 when valve 48a is open and valve 48b is closed. Alternatively, by closing valve 48a, opening valve 48b and closing valves 21a and 21b, the hot gas may be passed through open valve 49a, line 49 (valve 49b being closed), line 50, heat exchanger 44, line 51 and line 34 back to scrubbing tower 35. Excess gas from such a circulating system may be vented to a stack by line 52 in amounts controlled by valve 52a which maintains a constant pressure of approximately 330 p.s.i.g. in the scrubber tower. Air for effecting regeneration and rejuvenation is introduced from source 53 by compressor 54 which is provided with intercoolers and condensate removal means so that about 3419 pounds per hour of air is compressed to give 3327 pounds per hour of air at about 365 p.s.i.g. and 326° F., compressors being operated in accordance with the pressure in line 55 so that when valve 55a is closed compressor 54 will not operate.

The operation of the reactivation system will now be described in further detail as applied to the catalyst bed in reactor 14, the same general cycle of steps being employed for the reactivation of any other of the catalyst beds.

With valves 21a, 21b, 20a, 20'a, 23a, 22a and 25a closed, valves 15'a and 13'a are opened and valve 13a is closed to divert the hot charging stock stream from reactor 14 to the alternate reactor which has previously been prepared for on-stream conditions. Then valves 20a, 20'a and 23a are opened to introduce hot hydrogen at about 1050° F. into line 21. Valve 22a is now opened and the hot hydrogen allowed to purge the charging stock content of the reactor into line 15 through valve 15a. The hydrogen purge step may require about 25 minutes. Then valves 15a and 23a are closed, valve 49b and 48a are closed, 26a is opened, valve 26b is set for pressure reduction and valve 25a is opened so that the pressure in reactor 14 is gradually reduced to atmospheric. This depressuring step may require about 10 minutes.

During the purging and depressuring steps, flue gas is introduced into the system, said flue gas circulating via lines 47, 48, 49, 50, etc. at low pressures (about atmospheric pressure in the scrubber tower). After the depressuring step, valve 21b is opened and a part of the circulating flue gas passes through flow control valve 56 and line 57 to 21 for displacing hydrogen from the reactor through lines 24 and 26. This flue gas purging step may require approximately one hour, after which time valve 26a is closed, 21a and 49b opened, 49a and 21b closed, and pressure control valve 52a set for repressuring. The flow of flue gas is continued until the pressure in the scrubber tower reaches about 330 p.s.i.g. This repressuring step may require about 10 minutes.

At this time valves 48a and 49a are opened, valves 49b and 48b are closed so that the flue gas which leaves heater 46 at 700° F. flows through lines 48, 24 and 25 to reactor 14 and thence through lines 22, 21, 49, 50, 51 and 34 to scrubber 35, thence through lines 40, 42, 43 and 45 back to heater 46. Regeneration is then initiated by opening 55a and introducing air from line 55 and line 32 into the circulating flue gas stream entering tower 35, the amount of air being controlled to prevent the combustion front in the catalyst bed from exceeding a temperature of about 1050° F.; usually the flue gas entering the catalyst bed during regeneration will contain only about 1 percent of oxygen. It may require about 2 to 10 hours, usually about 5 hours, for the combustion front to traverse the bed, and during this combustion of hydrocarbonaceous deposit on the catalyst, large amounts of water and appreciable amounts of sulfur dioxide are produced. The combustion products carried upwardly from the combustion zone are substantially free from oxygen so that surfur dioxide contained therein will not be converted to sulfur trioxide, although some sulfur trioxide may be produced in the combustion zone itself. Gases leaving the reactor are cooled in exchanger 44 to about 500° F., scrubbed with the aqueous scrubbing medium in tower 35, supplemented with more air, and reheated in exchanger 44 and heater 46 to about 700° F. before being returned to the reactor. Excess flue gas is vented through line 52.

Substantially all sulfur dioxide and most of the water is removed from the circulating gases in the scrubbing step. Water itself under the temperature and pressure conditions (100° F. and 300–330 p.s.i.g.) may remove substantially all of the sulfur dioxide from the circulating gases, but it may be necessary to employ an alkaline agent in the scrubbing liquid to insure substantially complete removal of sulfur dioxide. When sodium hydroxide is employed as the alkaline material, its concentration may be of the order of about .01 percent to 1 percent.

The cooling of the circulated gases enables the use of a circulator 41 which is designed to operate at ordinary temperatures and the circulator is protected against any solids which might be entrained in the gases leaving the reactor. Any solids withdrawn with the scrubbing liquid can, of course, be recovered by filtration or other known means.

When the combustion front has traversed the catalyst bed, heater 46 is adjusted to give a transfer line temperature of 1050° F. and circulation is continued in order to reheat the catalyst bed to a temperature of about 1050° F. During this reheating operation, the introduction of flue gas from line 29 is discontinued by closing valve 29a and decreasing the circulation rate so that the oxygen content of the gas stream is gradually increased. The net production of flue gas during the regeneration and reheating steps is vented from the system through line 52. The reheating step may require about 1 hour and 30 minutes, after which time the catalyst may be directly rejuvenated by continuing the circulating of hot air at about 1050° F. through the catalyst bed, for a period of about 5 to 10 hours, at a pressure of about 300 p.s.i.g. At the end of the rejuvenation step, valve 55a is closed, valves 48b, 49b are opened, valves 48a, 49a are closed, valve 29a is opened and the system is purged at high pressure with flue gas while the catalyst bed is cooled from about 1050° F. to about 925° F. using heater 46 effluent at about 920° F.; this step may take about 40 minutes. The system is then depressured by setting pressure control valve 52a for depressuring to atmospheric pressure. The depressure step may take about 10 minutes. The flue gas is now circulated through the system for a time sufficient to purge all oxygen therefrom; this step may take about 1 hour. After all oxygen is purged from the system, valve 49a is opened, valves 49b and 21a are closed, valve 26a opened, valve 26b set for low pressure operation to the stack, and valve 23a is opened to purge flue gas from the reactor with a hydrogen mixture from lines 20 and 20' whose temperature is controlled to about 925° F. by valves 20a and 20'a. The hydrogen stream is passed through the reactor until all flue gas has been displaced from the reactor. Then pressure control valve 26b is reset to pressure the reactor to operating pressure, at which time valve 26a is closed. At this point the reactor 14 is ready to be put back on stream by opening valve 15a, closing 25a, closing 22a and 23a, opening 13a, closing 13'a and closing 15'a. Reactor 14 is now back on-stream and the alternate reactor is off-stream.

Although the use of scrubbing tower 35 minimizes catalyst deactivation by sulfation of the alumina, a small amount of sulfation might take place in the combustion zone itself and it may, therefore, be desirable to interpose at infrequent intervals a hydrogen treatment between the regeneration and rejuvenation steps. Such a hydrogen treatment can be effected by purging the reactor with flue gas after the regeneration step in a manner similar to the above-described purging of oxygen after the rejuvenation step and reheating the catalyst bed to about 1050° F. When the catalyst is thus purged from oxygen, hot hydrogen may be passed therethrough by opening valve 23a and this hydrogen may be circulated through the system in the same way that flue gases are circulated therethrough so that the catalyst may receive a hydrogen treatment for a period of about 5 hours. After the hydrogen treatment, the hydrogen is removed from the system by line 26 with valve 26b set to low-pressure operation and flue gas may be introduced to displace all hydrogen from the system and for then repressuring the system with air prior to the rejuvenation step as hereinabove described.

The effectiveness of the above-described catalyst reactivation system has been demonstrated by laboratory tests. These tests have shown that sulfur dioxide alone in the absence of oxygen has very little tendency to deactivate catalyst and that after such deactivation, the catalyst can be readily rejuvenated. Thus, when an M.C. naphtha of the type hereinabove described was hydroformed under substantially the conditions above set forth with (1) fresh catalyst, (2) fresh catalyst previously contacted with sulfur dioxide at 950° F. and atmospheric pressure for 24 hours in the absence of oxygen, and (3) fresh catalyst exposed to both sulfur dioxide and oxygen under the conditions of (2), the following results were obtained:

*F-1 Octane Numbers*

| Period On-Stream Prior to Octane No. Determination | Fresh Catalyst (1) | Catalyst Exposed to $SO_2$ (2) | Catalyst Exposed to $SO_2 + O_2$ (3) |
|---|---|---|---|
| 20 hours | 97 | 91 | 61 |
| 80 hours | 95 | 83 | 59 |
| After rejuvenation: | | | |
| 20 hours | (98) | 98 | 91 |
| 80 hours | (95) | 94 | 90 |

The catalyst exposed to both sulfur dioxide and oxygen doubled its weight and X-ray examinations showed that the alumina base was largely converted to aluminum sulfate. Treatment of such catalyst under hydro-forming conditions, or with hydrogen, brought the weight back to substantially the original weight, but did not restore the catalyst to its original activity. Since some sulfur deactivation may take place even with sulfur dioxide removal from recirculated regeneration gas, a treatment at infrequent intervals with hydrogen between the regeneration and rejuvenation steps is highly advantageous.

In a study to determine the effects of using a regeneration gas having as components sulfur dioxide and water vapor, a 0.6 percent platinum-on-alumina catalyst was carried through 18 cycles using a regeneration gas composed of 0.2 percent sulfur dioxide, 0.2 percent CO, 20 percent $CO_2$, 10 percent $H_2O$, 2 percent $O_2$, and 67.6 percent $N_2$. After each regeneration the catalyst quality was checked by a hydroforming run using a 360° F. end point Mid-Continent naphtha, operation conditions being 950° F. 200 p.s.i.g., two space velocity and 5,000 s.c.f. of hydrogen per barrel. The reformate samples taken at the end of 10-hour periods following regeneration with the above gas showed, as an average, octane numbers of about 95 and at the end of 100-hour periods, about 90. Catalyst which is regenerated by gas containing not more than 1 percent moisture and substantially free of sulfur-dioxide produces reformate which at the end of the 10-hour period shows about 98 octane number and at the end of the 100-hour period of about 97.

It will be seen that we have accomplished the objects of our invention and while we have illustrated the invention by specific example, it should be understood that alternative arrangements, operating procedures, and conditions will be apparent from the above description to those skilled in the art.

We claim:

1. In a process for hydroforming naphtha by passing naphtha vapors and recycled hydrogen under conversion conditions through a series of platinum-on-alumina catalyst beds with reheating between beds and wherein said naphtha contains a small amount of sulfur so that hydrocarbonaceous deposits which accumulate on the catalyst contain sulfur, the improved method of regenerating said catalyst which comprises burning sulfur-containing hydrocarbonaceous material to obtain a flue gas containing water and an oxide of sulfur, scrubbing said flue gas under a pressure in the range of 100 to 500 p.s.i.g. with an aqueous medium for removing said oxide of sulfur and most of said water, compressing the scrubbed flue gas, reheating it to regenerator inlet temperature and introducing it into the catalyst bed together with an amount of uncombined oxygen for supporting combustion of hydrocarbonaceous deposits without exceeding safe temperature limits.

2. The method of claim 1 wherein the aqueous medium is a dilute aqueous alkaline solution substantially free from combined nitrogen.

3. The improvement of claim 1 wherein the aqueous medium is water containing from about .01 percent to 1 percent of sodium hydroxide.

4. In a process for the hydroforming of a petroleum naphtha by intermittently passing a charge consisting essentially of naphtha vapors and recycled hydrogen with minor amounts of sulfur compound contaminants contained in said charge under conversion conditions through a platinum-on-alumina catalyst bed in a reaction zone, under which conversion conditions, a deposit of sulfur-containing hydrocarbonaceous deposits are formed in said bed of catalyst and periodic regenerations of said catalyst are required to maintain the activity of said platinum-on-alumina catalyst at a predetermined level, the improved method of regenerating said catalyst which comprises the steps of burning the sulfur-containing hydrocarbonaceous material from said bed of catalyst with an oxygen-containing flue gas to form a recycle flue gas stream containing water and an oxide of sulfur, cooling said stream, scrubbing said cooled stream under a pressure of about 100 to 500 p.s.i. with an aqueous medium to remove water vapor and said oxide of sulfur, compressing the cooled stream for recirculating it to the burning step, adding a controlled amount of oxygen to the stream and heating said stream to regenerator inlet temperature before reintroducing it to the burning step.

5. The method as described in claim 4 wherein the aqueous medium is a dilute aqueous alkaline solution substantially free from combined nitrogen.

6. The method of claim 4 wherein the aqueous medium contains a concentration of alkali metal hydroxide sufficient to provide about one to two mols per mol of sulfur dioxide to be removed.

7. The method of claim 4 which includes the step of contacting the regenerated catalyst with a gas having an oxygen partial pressure greater than 0.4 atmosphere and at a temperature of about 950° to 1050° F. prior to again contacting said catalyst with charging stock.

8. The method of claim 7 which includes the step of contacting the catalyst with hot hydrogen after its regeneration and prior to the step of claim 7.

9. The method of regenerating a platinum-on-alumina catalyst bed which has been deactivated by contact with a sulfur-containing naphtha at a temperature in the range of about 850° to 950° F. under a pressure in the range of 100 to 500 p.s.i. in the presence of recycled hydrogen whereby said catalyst has become coated with a sulfur-containing hydrocarbonaceous deposit, which method comprises pressuring a flue gas to a pressure within the range of 100 to 500 p.s.i.g. and partially dehydrating said flue gas, purging hydrogen from the deactivated catalyst bed with said dehydrated flue gas, adding to said flue gas sufficient air to supply a concentration of about 1 percent of free oxygen therein, heating the oxygen-containing flue gas to a temperature in the range of about 700° to 800° F., burning deposits from the catalyst bed with the oxygen contained in said flue gas whereby sulfur dioxide and water vapor are formed, cooling the combustion products, countercurrently contacting said cooled combustion products in a scrubbing tower at a pressure in the range of about 100 to 500 p.s.i.g. with an aqueous medium introduced into the tower at a temperature of about 60° to 100° F., compressing the effluent gas stream from the scrubbing tower, and continuing the foregoing steps while venting net flue gas production until a combustion front has traversed the catalyst bed.

10. In a regenerative hydroforming process wherein platinum-on-alumina catalyst is contacted in a reactor with naphtha in the presence of hydrogen under hydroforming conditions during on-stream periods and is periodically reactivated between on-stream periods, the improved method of treating the catalyst between on-stream periods which comprises purging the catalyst in the reactor with hydrogen at a pressure in the range of 100 to 500 p.s.i.g., depressuring the reactor to approximately atmospheric pressure, generating flue gas by burning hydrocarbonaceous material, cooling said flue gas and dehydrating it to remove therefrom most of the water formed in the burning step, purging hydrogen from the reactor with said dehydrated flue gas, increasing the pressure of dehydrated flue gas in the reactor to at least about 100 p.s.i. but not more than 500 p.s.i., passing dehydrated flue gas together with a small amount of free oxygen through said reactor at a pressure in the range of 100 to 500 p.s.i. with an inlet temperature in the range of about 700 to 800° F. for effecting combustion of carbonaceous deposits while limiting the amount of introduced oxygen to prevent the combustion zone temperature from substantially exceeding about 1050° F., reheating the catalyst in the reactor, depressuring the reactor after the reheating step to approximately atmospheric pressure and purging oxygen-containing gas from the reactor with substantially oxygen-free dehydrated flue gas, purging flue gas from the reactor with hot hydrogen at substantially atmospheric pressure and repressuring the reactor with hot hydrogen before again resuming onstream operation.

11. The method of claim 10 wherein at least a part of the dehydrated flue gas is obtained by scrubbing combustion products formed by burning hydrocarbonaceous material with an aqueous scrubbing medium.

12. The method of claim 10 which includes the step of rejuvenating the catalyst after the reheating step and prior to the second named depressuring step by contacting reheated catalyst with hot air.

13. In a process for hydroforming naphtha by passing naphtha vapors and recycled hydrogen under conversion conditions through a series of platinum-on-alumina catalyst beds with reheating between beds, wherein said naphtha contains a small amount of sulfur so that carbonaceous deposits which accumulate on the catalyst contain sulfur, the improved method of treating the catalyst after introduction of naphtha vapors thereto is stopped and before further introduction is resumed, which method comprises depressuring the catalyst bed by venting hydrogen therefrom through a first vent line, purging hydrogen from said bed through said first vent line with flue gas, thereafter closing the first vent line and continuing the introduction of flue gas to build up flue gas pressure to at least about 100 p.s.i.g. but not more than 500 p.s.i.g., then passing flue gas from one end of the catalyst bed through a scrubbing zone and thence circulating it through a gas heating zone to the other end of the catalyst bed while introducing a controlled amount of air into the circulating gas stream to burn deposits and produce additional flue gas, purging at least a part of the additional flue gas from the system through a second vent line, said second vent line communicating with said scrubbing zone, scrubbing the circulating gas stream with an aqueous scrubbing medium to remove most of the water and substantially all of the sulfur dioxide formed by the burning of said deposits, raising the temperature of the gas heating zone after the burning of deposits is substantially complete, continuing the circulation of gas through the gas heating zone and catalyst bed to reheat the catalyst bed, and purging uncombined oxygen from the system before reintroducing naphtha vapors.

14. Apparatus for reactivating platinum-on-alumina catalyst in a regenerative naphtha hydroforming system, which apparatus comprises a plurality of reactors adapted to contain platinum-on-alumina catalyst, an upper manifold selectively communicating with said reactors, a lower manifold selectively communicating with said reactors, a purge vent line connected through a valve to said lower manifold, a pressure control valve in said purge vent line, a scrubbing tower, a vent line containing a pressure control valve communicating with the top of said scrubbing tower, a heat exchanger, a reheater, connections for passing gas from the lower manifold through said heat exchanger to the lower part of said tower and from the upper part of said tower through said heat exchanger and heater to said upper manifold, alternate connections for introducing gases from the upper manifold through said heat exchanger to the lower part of the tower and thence from the upper part of the tower through said heater to the lower manifold, connections for introducing an aqueous scrubbing liquid into the upper part of the tower and for withdrawing liquid from the base of said tower, connections for introducing externally generated flue gas at the base of said tower, connections for introducing air into a flue gas-containing line in the system, and connections for introducing hot hydrogen into the upper manifold.

15. Apparatus for reactivating platinum-on-alumina catalyst in a regenerative naphtha hydroforming system which comprises a plurality of reactors adapted to contain platinum-on-alumina catalyst, a plurality of heaters, connections for passing a naphtha charge in series flow through said reactors in heater-reactor sequence and valves in connections leading to and from each reactor for selectively isolating each reactor from said series flow, an upper manifold selectively communicating with the top of each of said reactors through lines each containing a valve, a lower manifold selectively communicating with the bottom of each reactor through lines each containing a valve, a purge vent line connected to said lower manifold and containing both a block valve and a pressure control valve, a scrubbing tower, a vent line communicating with the top of the scrubbing tower and containing a pressure control valve, a heat exchanger, a flue gas reheater, a connection for passing gas from the lower manifold through said heat exchanger to the lower part of the tower and a valve in said connection, connections including a gas circulator leading from the upper part of said tower through said heat exchanger and flue gas reheater to said upper manifold and a valve in said last named connections, alternate connections for introducing gases from the upper manifold through said heat exchanger to the lower part of the tower and a valve in said alternate connections, an alternate connection for conveying gas from said flue gas reheater to the lower manifold and a valve in said last named alternate connection, connections including a pump for introducing an aqueous scrubbing liquid into the upper part of the tower and a line for withdrawing liquid from the base of the tower, connections for introducing externally generated flue gas at the base of the tower, connections for introducing air into a flue gas containing line in the system and a line for introducing hot hydrogen into said upper manifold and a valve in said last named line.

References Cited in the file of this patent

UNITED STATES PATENTS

| | | |
|---|---|---|
| 2,155,853 | Anthony | Apr. 25, 1939 |
| 2,357,531 | Mather et al. | Sept. 5, 1944 |
| 2,403,319 | Williams | July 2, 1946 |
| 2,406,112 | Schulze | Aug. 20, 1946 |
| 2,459,480 | Welty et al. | Jan. 18, 1949 |
| 2,479,110 | Haensel | Aug. 16, 1949 |
| 2,654,694 | Berger | Oct. 6, 1953 |
| 2,661,383 | Beckberger et al. | Dec. 1, 1953 |
| 2,664,404 | Blatz et al. | Dec. 29, 1953 |
| 2,753,295 | Ramella | July 3, 1956 |
| 2,755,230 | Guernsey | July 17, 1956 |
| 2,773,013 | Wolf et al. | Dec. 4, 1956 |
| 2,773,014 | Snuggs et al. | Dec. 4, 1956 |
| 2,792,337 | Engel | May 14, 1957 |

FOREIGN PATENTS

| | | |
|---|---|---|
| 708,554 | Great Britain | May 5, 1954 |

Disclaimer 2,892,770.—*John R. Coley*, Gary, and *Robert J. Hengstebeck*, Valparaiso, Ind. PLATINUM CATALYST REGENERATION AND REJUVENATION SYSTEM. Patent dated June 30, 1959. Disclaimer filed Oct. 1, 1963, by the assignee, *Standard Oil Company*.

Hereby enters this disclaimer to claims 1, 4 and 7 of said patent.

[*Official Gazette December 31, 1963.*]